July 5, 1927.

R. A. CARD

FAUCET OR VALVE

Filed Aug. 2, 1926

1,634,771

Inventor:

Roy A. Card

Patented July 5, 1927.

1,634,771

UNITED STATES PATENT OFFICE.

ROY A. CARD, OF WASHINGTON, DISTRICT OF COLUMBIA.

FAUCET OR VALVE.

Application filed August 2, 1926. Serial No. 126,535.

The invention relates particularly to faucets or valves intended for use on urns, containers, and other receptacles in which tea, coffee, milk, and other beverages are made or dispensed but it also applies to faucets or valves meant to be used for other purposes. The object of the invention is to provide a practical faucet or valve which may be quickly and easily cleaned without the use of tools with which to take it apart and without removal from the urn, container, or other receptacle to which it may be attached and one in which the bore is so constructed and of such material that the quality of liquids or beverages retained in the faucet or valve for periods of time may not be impaired thereby.

Figure 1:
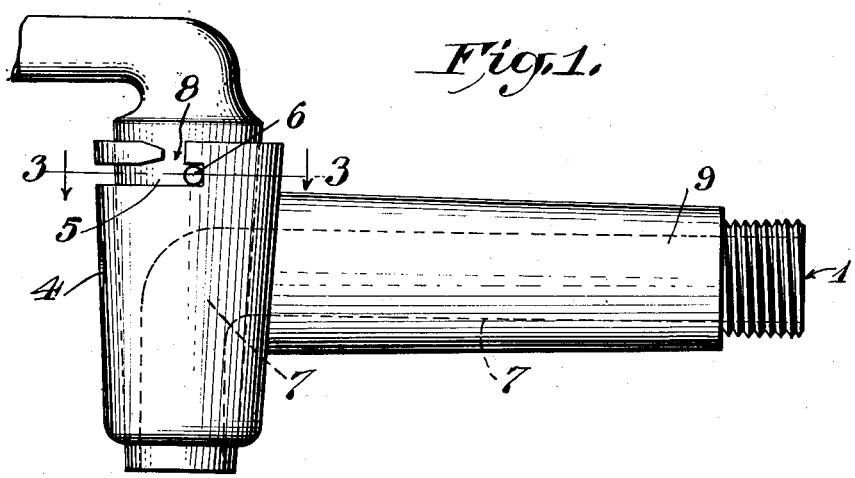
Figure 2:
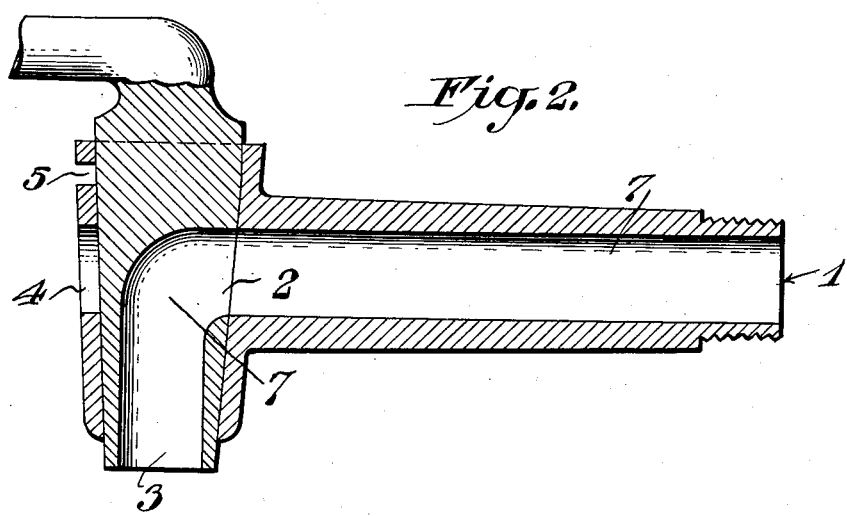
Figure 3:
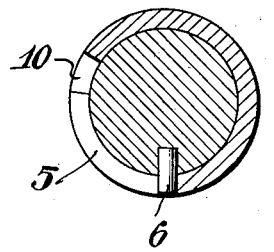
Figure 4:
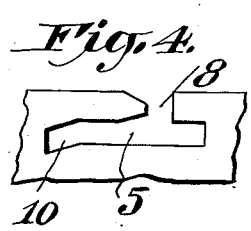

In the accompanying drawing, one form of the invention is illustrated and to facilitate reference to the parts, that part of the faucet or valve that attaches to the urn, container, or other receptacle shall be designated the casing and the part that turns in the casing shall be designated the plug in this specification and in the claims. Figure 1 is a side elevation of the faucet or valve. Figure 2 is a longitudinal section of the faucet or valve. Figure 3 is a cross section taken on the line 3—3 of Figure 1; and Figure 4 is a detail view of the opening or slot in which the projection operates.

The faucet or valve described with reference to the drawing in this specification, is one through which liquid in the operation of being dispensed enters the inlet end (1 Figure 2), flows longitudinally to the opening in the plug (2), and thence transversely from the outlet opening in the plug (3). The bore (7) is of a same diameter and smoothly nickel plated throughout the longitudinal and transverse distance (from 1 to 3 Figure 2). A circular opening (4) in the wall of the transverse section of the casing is on a line with and of a same (or larger) diameter as (or than) the bore (7). The plug is held from lifting out of the casing when the faucet or valve is in use by means of the operation of a projection (6) so constructed in or on the cylindrical surface of the plug that it operates, by being moved in a narrow opening or slot (5 Figure 4) extending longitudinally in the transverse section of the casing, when the plug is turned. The opening or slot (5) extends at an angle (10 Figure 4) from a point reached by the projection (6) after the bore of the faucet or valve has been closed (7 at 2 Figure 2) and the operation of the projection (6) in the angle of the opening or slot (10) causes the plug to tighten in the casing thereby preventing leakage when the faucet or valve is closed. An opening (8) from the large annular end of the transverse section of the casing through which the projection passes to the longitudinal opening or slot (5) when the parts are assembled, is so located in the annular distance of the transverse section of the casing that the plug may be lifted out only after having been turned far enough in the casing to partly open the bore (7) of the faucet or valve (7 at 2), for the reason, that, in turning the plug of a faucet or valve through which liquid is being drawn into cups or small receptacles of a like nature, it is natural for the operator of the valve to be careful after the plug has been rotated far enough in the casing to start the flow. This is particularly true when coffee is drawn from urns into cups, for, the bore of faucets or valves used on coffee urns must be large enough to allow the beverage to be drawn rapidly to avoid cooling in the making, and, with the large bore necessitated, a careless manipulation of the faucet or valve after the liquid had started to flow, would result in overflowing the cup. This being true, it will readily be seen that there is a natural tendency to use greater care in rotating the plug of such a faucet or valve after the plug has been turned far enough to partly open the bore. To show how my invention takes advantage of this, I will describe the manner in which coffee faucets or valves are operated: In drawing coffee from the urn, the plug is first turned more or less quickly until it has been rotated far enough to start the flow, it is then turned slowly and carefully to regulate the flow, and, when it is desired to close the valve, the act of closing is done with a quick movement of the plug. The fact, that these faucets or valves have large bores, tends to produce the series of movements I have described and my invention takes advantage of this universal series of movements in the manipulation of faucets or valves by having the slot (8) and the projection (6) so situated that the plug may be removed from the casing at a point where it is least likely to be lifted out accidentally when the faucet or valve may be in use, and, by having the slot so constructed that the quick movement universally used in closing such valves should carry the projection (6)

safely past the slot (8), thus preventing the plug from being accidentally lifted out when the faucet or valve is in use.

I claim as my invention:

1. In a rotary valve, a casing, a tapered plug therein having a projection thereon, said casing being provided with a slot in the wall thereof to receive said projection to normally retain the plug in the casing and limit the degree of rotation of the plug, said slot opening through an end wall of the casing to permit removal of the plug only when the valve is in partly open position.

2. In a rotary valve, a casing, a tapered plug therein having a projection thereon, said casing being provided with a slot in the wall thereof to receive said projection to retain the plug within the casing, said slot opening through an end wall of the casing to permit removal of the plug only when the valve is in partly open position.

3. In a rotary valve, a casing, a tapered plug in said casing, a slot in the casing to receive a projection on the tapered plug, said slot and projection located to normally retain the plug in the casing and to permit removal of the plug only when the valve is in partly open position.

ROY A. CARD.